UNITED STATES PATENT OFFICE.

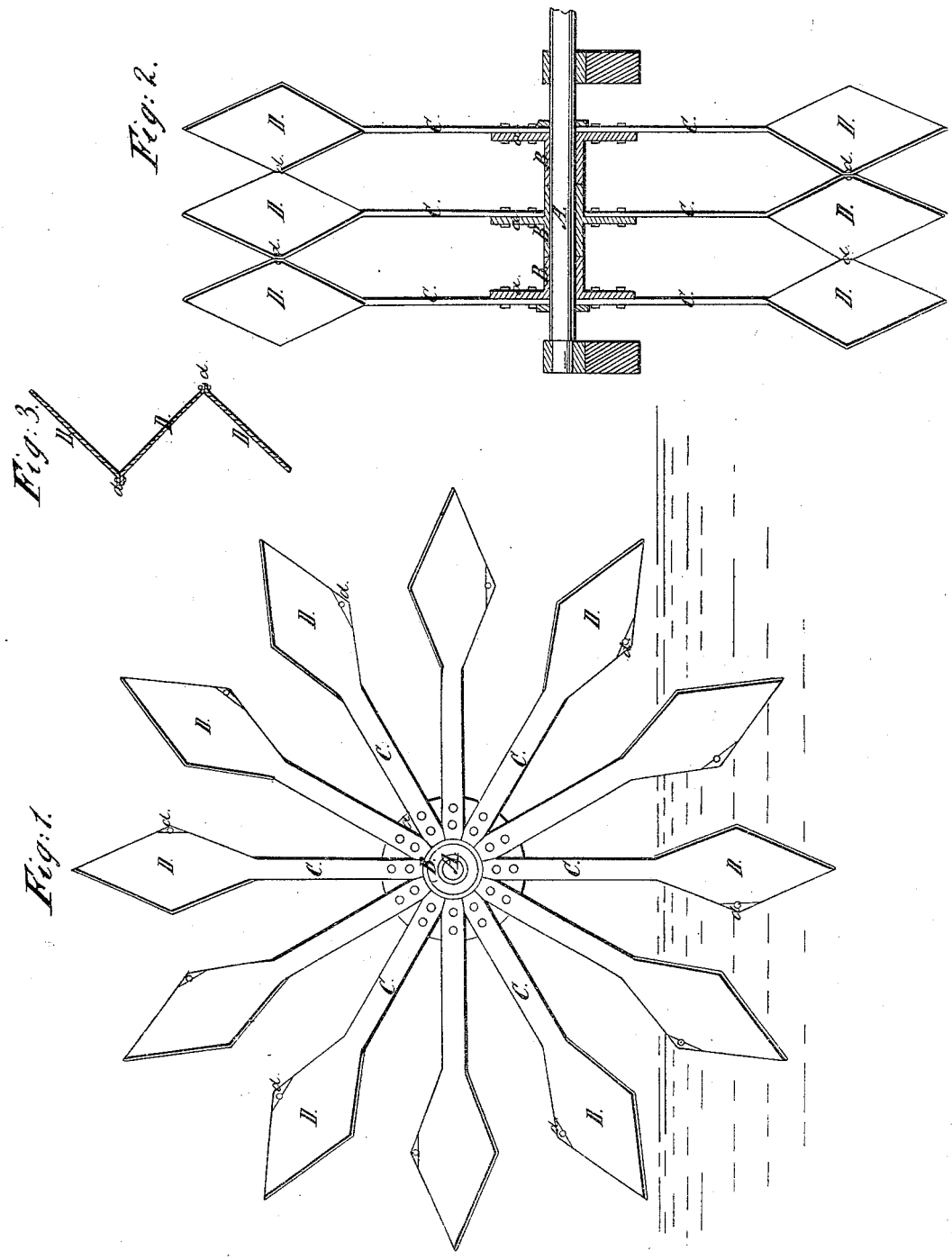

RICHARD B. LOCKE, OF STAPLETON, NEW YORK.

PADDLE-WHEEL.

Specification of Letters Patent No. 21,892, dated October 26, 1858.

*To all whom it may concern:*

Be it known that I, RICHARD B. LOCKE, of Stapleton, in the county of Richmond and State of New York, have invented a new and useful Improvement in Paddle-Wheels for Propelling Vessels; and I do hereby declare that the following is a full, clear, and exact description of the same, reference being had to the accompanying drawings, making a part of this specification, in which—

Figure 1 is a side view of a paddle wheel constructed according to my invention. Fig. 2 is a section of the same, taken nearly in a plane passing directly through the axis. Fig. 3 is a section through one of the buckets in a plane parallel with the axis of and perpendicular to the radius of the wheel.

Similar letters of reference indicate corresponding parts in the several figures.

This invention consists in making the buckets severally of a series of boards or plates having the form of parallelograms, and arranged side by side obliquely to the plane of revolution and with their faces oblique to the axis of the wheel, and united at their angles to produce a zig-zag profile in the section taken in a plane parallel with the axis of and perpendicular to the radius of the wheel, as well as at their outer and inner edges, substantially as represented in the accompanying drawings and hereinafter described.

To enable others skilled in the art to make and use my invention, I will proceed to describe its construction and operation.

A, is the shaft of the wheel and B, B, B, are a series of flanched hubs, instead of which a single hub with several flanches $a$, $a$, $a$, may be used, the number of the said flanches corresponding with the number of parallelograms in a bucket.

C, C, C, are arms of which a number corresponding to the intended number of buckets are bolted to each of the said flanches; the arms of the several flanches being opposite to each other and each having attached a board or plate D, of the form of a parallelogram; the said boards or plates being arranged with their faces radial to the axis of the wheel, but at an angle oblique to the plane of revolution, and with two of their angles directed toward and from the axis of the wheel, and the other two arranged so that a plane parallel with the axis of the wheel but perpendicular to its radius may pass through the whole of those attached to one row of arms and intended to form one bucket. The obliquity of the adjacent boards or plates intended to form one bucket is in opposite directions, as shown in Fig. 3, and said boards or plates are united by riveting, bolting, or otherwise at their adjacent angles as shown at $d$, $d$, in Figs. 1, 2, and 3; thus producing in the section of the bucket—in a plane parallel with the axis of but radial to the wheel—the zig-zag profile shown in Fig. 3, and also producing a zig-zag form of the outer and inner edges of the buckets as shown in Fig. 2. These boards or plates D, D, D, of each bucket by being thus united are caused to stay each other, but the several buckets may be made to stay each other by rings interposed at the junction of the angles of said boards or plates, and the wheel may be further stiffened by rings applied to the arms and by stays applied in any suitable manner. Each bucket should be composed of an odd number of boards or plates D, D, D, in order that both sides may present similar surfaces to the water and the wheel consequently be as effective in backing as in going ahead.

The operation of these buckets is as follows:—The buckets in entering the water present first only a series of points and then a series of edges, so that they produce very little displacement by their entrance, and they arrive near their most effective position before any very considerable portion is submerged. In leaving the water, very much less "lift" is produced than is the case with the hollow V, or zig-zag buckets heretofore employed, in which two long straight edges are united at the angles, or even than with the unconnected oblique buckets heretofore used; as the surface presented to the water begins to be diminished almost as soon as the wheels pass their most effective position.

I do not claim the use of buckets having the form of parallelograms arranged with their angles directed toward and from the axis of the wheel. Nor do I claim the making of buckets of zig-zag form. but

What I claim as my invention, and desire to secure by Letters Patent, is:—

Connecting the plates D to each other or to staying rings, at their adjacent angles ($d$, $d$), substantially as herein shown, and described, for the purposes set forth.

RICHD. B. LOCKE.

Witnesses:
W. HAUFF,
HENRY T. BROWN.